US006145977A

United States Patent [19]

Natsuhara et al.

[11] Patent Number: 6,145,977

[45] Date of Patent: Nov. 14, 2000

[54] APPARATUS AND METHOD FOR INK JET RECORDING

[75] Inventors: Toshiya Natsuhara, Takarazuka; Yasuhiro Ohno, Amagasaki; Hideo Hotomi, Nishinomiya; Masakazu Takahashi, Sanda, all of Japan

[73] Assignee: Minolta Co., Ltd., Osaka, Japan

[21] Appl. No.: 09/026,685

[22] Filed: Feb. 20, 1998

[30] Foreign Application Priority Data

Feb. 21, 1997 [JP] Japan .................................... 9-037326

[51] Int. Cl.[7] ...................................................... G01D 11/00

[52] U.S. Cl. .............................................................. 347/100

[58] Field of Search ......................... 347/95, 100, 68–72; 106/31.27, 31.6

[56] References Cited

U.S. PATENT DOCUMENTS 4,965,612 10/1990 Sakaki et al. .
5,156,675 10/1992 Breton et al. .
5,160,372 11/1992 Matrick ................................ 106/31.43
5,208,605 5/1993 Drake .
5,397,386 3/1995 Nakazawa et al. .
5,412,410 5/1995 Rezanka .

*Primary Examiner*—N. Le
*Assistant Examiner*—Michael S Brooke
*Attorney, Agent, or Firm*—McDermott, Will & Emery

[57] ABSTRACT

The present invention provides an ink jet printer which performs recording by causing a nozzle to discharge an ink drop onto a recording medium. The nozzle is connected to an ink channel in which aqueous ink is housed. The printer head can vary the dot size on the recording medium by changing the size of the drop that is discharged from the nozzle. The aqueous ink has a degree of surface tension change $\Delta S$ that is expressed by the relation $\Delta S=(S_1-S_3)/S_2$ of 0.3 or less, wherein $S_2$ is the surface tension at 25° C., and has a value of 20 to 50 dynes/cm, $S_1$ is the surface tension at 5° C., and $S_3$ is the surface tension at 40° C.

20 Claims, 5 Drawing Sheets

APPARATUS AND METHOD FOR INK JET RECORDING

RELATED APPLICATIONS

This application is based on Japanese Patent Application No. 9-37326, the content of which being incorporated by reference.

BACKGROUND OF THE INVENTION

1. Field of the Invention

The present invention relates to an ink jet recording apparatus and method using an aqueous ink and, more particularly, to an ink jet recording apparatus and method featuring improved multi-tone reproduction characteristics.

2. Description of the Prior Art

In ink jet recording apparatuses, such as ink jet printers, for the purpose of tone reproduction, a tone reproduction technique of binary value is in general practice such that a area tone method is employed with dot diameter size kept constant without any change. However, with such a reproduction method of binary value, it is difficult to carry out smooth tone reproduction free of reproduction irregularity with respect to various images, from solid image to highlight image, and to faithfully reproduce a middle color, such as human skin color, in full-color images such as photographic images.

For the purpose of improving tone reproduction of full-color images using such a reproduction technique of binary value, it is known to use ordinary four color inks (yellow ink, magenta ink, cyan ink, and black ink) and photo inks (cyan and magenta inks with low colorant concentration, and when required, black ink with low colorant concentration) in combination.

In such a method, however, heads corresponding to six or seven kinds of inks and cartridges for housing the inks are required, and this complicates the construction of the apparatus. Further, the increase in the kinds of inks to be used raises a problem such that when any one kind of the inks has been consumed, it is necessary to replace the cartridge of the consumed ink with a new cartridge, and this results in increased frequency of cartridge replacement at the user's end.

SUMMARY OF THE INVENTION

It is a primary object of the present invention to provide an ink jet recording method of a dot-size control system and an ink jet recording apparatus applied with the ink jet recording method, which enable constantly stable dot-size control even in the event of environmental changes, and which enable improvement in tone reproduction without involving complication of apparatus arrangement.

The present invention provides an ink jet printer which performs recording by causing an ink drop to be discharged from a nozzle and allowing the ink drop to deposit on a recording medium, the ink jet printer comprising a printer head including a nozzle for discharging ink drops and an ink channel in which an aqueous ink is housed, the printer head being capable of varying a dot size on the recording medium by changing the size of the ink drop to be discharged from the nozzle; and the aqueous ink having a degree of surface tension change $\Delta S$ expressed by the relation $\Delta S=(S_1-S_3)/S_2$ of 0.3 or less, and $S_2$ of 20 to 50 dyne/cm, in which $S_1$ is a surface tension of the aqueous ink at 5° C., $S_2$ is the surface tension at 25° C., and $S_3$ is the surface tension at 40° C.

The dot size control system is a technique in which ink droplets discharged from a nozzle of the head are varied for tone reproduction. This technique has an advantage that it permits good reproduction of multi-tone images and high precision images. Basically, the dot size control system enables multi-tone reproduction with three color inks and a black ink and, therefore, does not require separate use of a light color photo ink. Therefore, the system involves no problem of apparatus complication.

Unlike above mentioned ink jet recording method of binary value, however, an ink jet recording method of the dot size control system requires high environmental stability of ink droplets discharged from nozzles. For example, where image reproduction conditions are adjusted to deposit small size dots and larg size dots on recording paper in an ordinary-temperature environment, the dot reproducibility of large size dots is lowered in a low temperature environment, so that the reproducible range of dot sizes tends to shift toward the smaller dot-size side. A reverse phenomenon tends to occur in a high temperature environment. In proportion as the dot size range, from smaller dot to larger dot, for dot reproduction becomes larger, such a phenomenon is more pronounced.

DETAILED DESCRIPTION OF THE INVENTION

Figure 1:
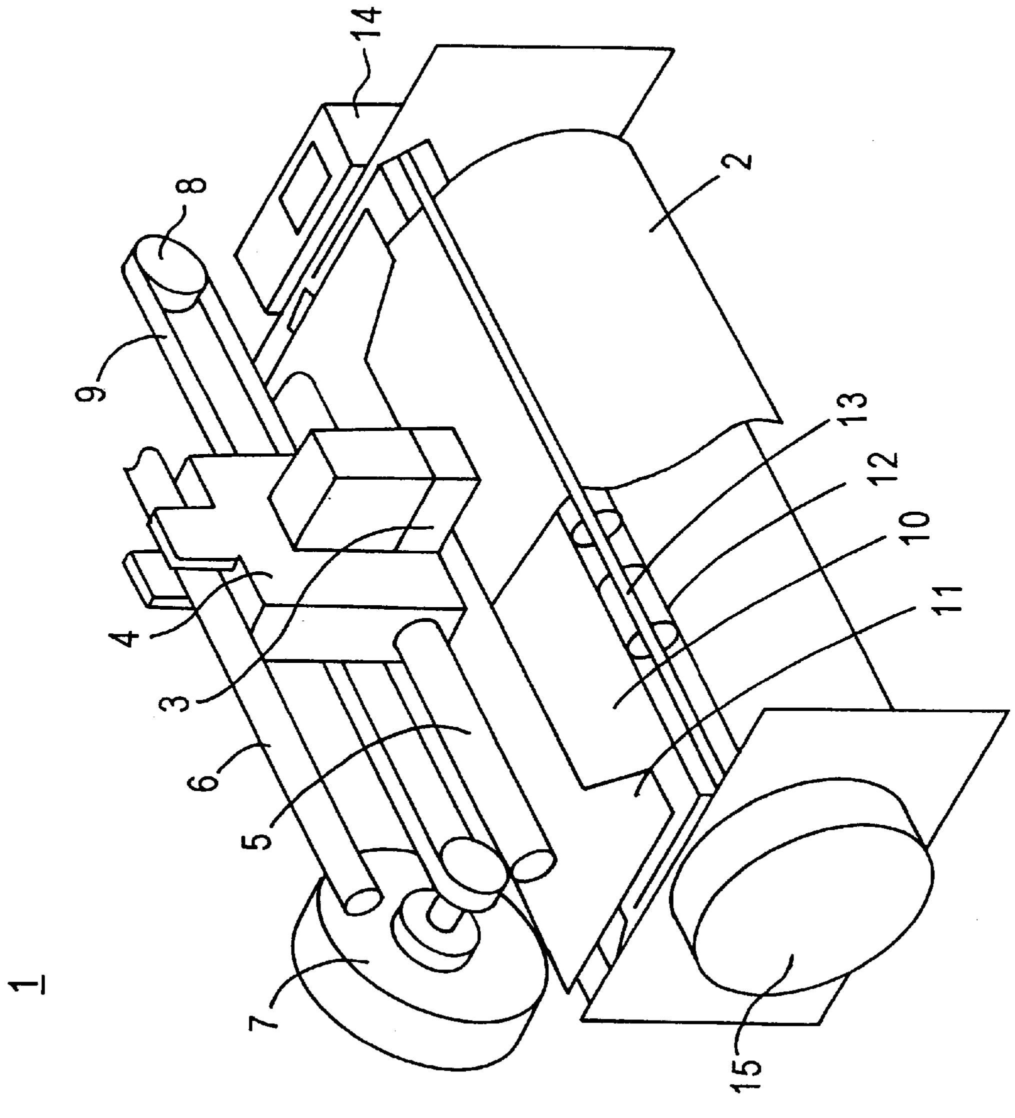
FIG. 1 is a perspective view showing general construction of an ink jet printer in accordance with the present invention.

The present invention relates to an ink jet printer which performs recording by causing an ink drop to be discharged from a nozzle and allowing the ink drop to deposit on a recording medium, the ink jet printer comprising a printer head including a nozzle for discharging ink drops and an ink channel in which an aqueous ink is housed, the printer head being capable of varying a dot size on the recording medium by changing the size of the ink drop to be discharged from the nozzle; and the aqueous ink having a degree of surface tension change $\Delta S$ expressed by the relation $\Delta S=(S_1-S_3)/S_2$ of 0.3 or less, and $S_2$ of 20 to 50 dyne/cm, in which $S_1$ is a surface tension of the aqueous ink at 5° C., $S_2$ is the surface tension at 25° C., and $S_3$ is the surface tension at 40° C.

By using inks having such specified surface tension characterized in temperature-dependent characteristics it is possible to solve above mentioned problems. That is, by controlling $\Delta S$ to 0.3 or less, the problems of dot reproducibility degradation on the larger dot-size side in a low temperature environment and dot reproducibility degradation on the smaller dot-size side in a high temperature environment can be readily corrected and solved on the recording apparatus. Preferably, $\Delta S$ is 0.25or less, more preferably 0.20 or less, further preferably 0.15 or less, and $S_2$ is 20 to 50 dyne/cm, preferably 25 to 45 dyne/cm, more preferably 30 to 45 dyne/cm.

In the present invention, it is desirable that the viscosity of the aqueous ink at 25° C. is 1.5 to 4.5 (cps), preferably 2.0 to 4.0 (cps). Also, it is desirable that pH of the aqueous ink at 25° C. is 7 to 10, preferably 7.5 to 9.5.

It is noted in the present application that surface tension measurement was made by using an automatic surface tensiometer (CBVP-Z type; made by KYOWA INTERFACE SCIENCE K.K.), and viscosity measurement was made by using a viscometer (Rheo Stress RS50; made by HAAKE K.K.).

Inks for use in the conduct of the present invention are aqueous inks incorporating an aqueous medium from the viewpoint of odor problem and safety. Aqueous inks for ink jet printing typically include, in addition to color material, various additives, such as moisture retention improver, viscosity modifier, surface tension modifier, and pH adjustor, which are added to water medium. The surface tension and viscosity of the ink will vary with the addition of such additives. In other words, above mentioned temperature-dependent characteristics can be adjusted to a predetermined range by adjusting the kinds, combination, and loadings of such additives.

Color materials for use in the ink include water-soluble dyes, such as acid dyes, direct dyes, and reactive dyes, oil-soluble dyes, pigments, and resin particles colored with various dyes and pigments. The color material content of the ink is 0.5 to 20% by weight, preferably 2 to 10% by weight, relative to the total weight of the ink.

In the present invention, for the purpose of adjusting the surface tension of the ink, it is desirable to add a surface active agent. Preferably, 0.01 to 5% by weight, preferably 0.1 to 5% by weight, of a nonionic surface active agent is added relative to the total ink weight. A particularly preferred surface active agent is a nonionic surface active agent expressed by the following formula (A) which is effective for reducing the rate of surface tension change with temperature.

(A)

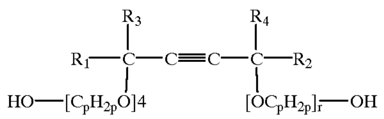

In the formula (A), $R_1$ and $R_2$ represent lower alkyl groups having 1 to 5 carbon atoms, preferably lower alkyl groups having 2 to 4 carbon atoms, more preferably isobutyl groups. $R_3$ and $R_4$ represent alkyl groups, having 1 to 5 carbon atoms, preferably methyl groups. p denotes an integer of 2 or 3. q and r denote an integer of 1 or more, preferably q+r is 2 to 60, more preferably 2 to 30.

Alkylene oxide adducts of acetylene glycol as expressed by the formula (A) wherein $R_1$=$R_2$=isobutyl group, $R_3$=$R_4$= methyl group, and p=2 are commercially available, including those known as OLFINE E1004 (q+r=3.5; made by Nisshin Kagaku Kogyo K. K.), OLFINE E1010 (q+r=10; made by Nisshin Kagaku Kogyo K. K.), and SURFYNOL 485 (q+r=30; made by Air Products K.K., United States of America).

In the present invention, it is desirable that the ink should contain, as an aqueous organic solvent, a compound selected from the group consisting of polyhydric alcohols having a hydroxyl value of 3, (mono-, di-, tri-) alkylene glycols, lower alkyl ethers of (mono-, di-, tri-) alkylene glycols, polyalkylene glycols, and mixtures of these compounds, from the standpoint of improving the moisture retention of the ink, as well as temperature stability of the ink in surface tension and viscosity.

Among polyhydric alcohols having a hydroxyl value of 3, glycerine is preferred. It is desirable that polyhydric alcohols are added within the range of 1 to 20% by weight, preferably 2 to 10% by weight.

Examples of preferred (mono-, di-, tri-) alkylene glycols are monoalkylene glycols, such as ethylene glycol, propylene glycol, butylene glycol, and hexylene glycol; dialkylene glycols, such as diethylene glycol and dipropylene glycol; and trialkylene glycol, such as triethylene glycol. Especially, diethylene glycol is preferred. It is desirable that (mono-, di-, tri-) alkylene glycols are added within the range of 1 to 30% by weight, preferably 2 to 15% by weight relative to the total ink weight.

Examples of preferred lower alkyl ethers of (mono-, di-, tri-) alkylene glycols are ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, and triethylene glycol monobutyl ether. In particular, triethylene glycol monobutyl ether is preferred. It is desirable that lower alkyl ethers of (mono-, di-, tri-) alkylene glycols are added within the range of 1 to 30% by weight, preferably 3 to 10% by weight, relative to the total ink weight.

For the polyalkylene glycols, it is preferable to use those having a molecular weight of 150 or more, preferably 150 to 600. Examples of such polyalkylene glycols are polyethylene glycol, polypropylene glycol, and copolymers of ethylene oxide and propylene oxide. In particular, polyethylene glycols having a molecular weight of 150 to 600, preferably 150 to 500, are preferred. It is desirable that polyalkylene glycols are added within the range of 1 to 10% by weight, preferably 2 to 8% by weight.

Inks for use in the present invention may be added with an aliphatic alcohol. For the aliphatic alcohol, alkyl alcohols having 1 to 5 carbon atoms, preferably 1 to 3 carbon atoms, such as methyl alcohol, ethyl alcohol, n-propyl alcohol, and isopropyl alcohol, may be used. Such aliphatic alcohol may be added in the range of 0.1 to 15% by weight, preferably 1 to 6% by weight relative to the total ink weight. The addition of such aliphatic alcohol can enhance drying characteristics of the ink during the process of recording, thus resulting in improved ink fixation.

In the present invention, an amphiphatic substance may be added to the ink. Examples of amphiphatic substances usable in the invention are includes urea, cyclic amides, such as 2-pyrrolidone, N-methyl-2-pyrrolidone, and alkanol amines, such as monoethanl amine, diethanol amine, and triethanol amine. Of these substance, triethanl amine is preferred. The amphiphatic substance may be added within the range of 0.01 to 10% by weight, preferably 0.1 to 5% by weight, relative to the total ink weight. The addition of an amphiphatic substance to the ink serves to prevent crystal deposition with time, and thus to improve time-stability of the ink.

A pH adjustor may be added to the ink in the invention.

Preferred pH adjustors are $NaHCO_3$ and $Na_2B_4O_7$. Addition of such adjustor serves to improve storage stability of the ink under sudden temperature change and ink stability to temperature change and to prevent nozzle jamming. The pH adjustor may be added in a quantity range of 0.01 to 2% by weight, preferably 0.05 to 1% by weight.

A water-soluble polymeric material may be added to the ink to be used in the invention. Examples of water-soluble polymeric material are polyvinyl alcohol, hydroxypropyl cellulose, carboxymethyl cellulose, hydroxyethyl cellulose, methylcellulose, water-soluble acrylic resin, polyvinyl pyrrolidone, gum arabic, dextrin, casein, and peptin. Such water-soluble polymeric material may be added within a quantity range of 1 to 15% by weight, preferably 2 to 10% by weight.

Inks for use in the invention may contain any known additive as required. For the additive, mildew proofing agent, antiseptic agent, chelating agent, oxygen absorbing agent, and quencher may be exemplified.

Preferred inks for use in the invention are aqueous inks having a water content of 60 to 90% by weight, preferably 70 to 90% by weight, of water.

EXAMPLES

The ink jet recording method of a dot size variable system in accordance with the present invention will now be described in detail. FIG. 1 is a perspective view showing general arrangement of an ink jet printer 1 representing one form of ink jet recording apparatus of the invention.

The ink jet printer 1 includes a recording sheet 2, or a recording medium, such as paper or OHP sheet, a printer head 3 having an ink cartridge disposed on the top thereof, a carriage 4 carrying the printer head 3, swinging shafts 5, 6 for causing the carriage 4 to reciprocate in parallel relation to the recording surface of the recording sheet 2, a drive motor 7 for actuating the carriage 4 to reciprocate along the swinging shafts 5, 6, a timing belt 9 for converting the rotation of the drive motor 7 into reciprocating movement of the carriage 4, and an idle pulley 8. It is noted that the ink cartridge on the top of the printer head 3 is removably mounted.

The ink jet printer 1 also includes a platen 10 which concurrently acts as a guide plate for guiding the recording sheet along the transport path, a sheet presser plate 11 for pressing the recording sheet 2 to prevent the sheet from floating up, a discharge roller 12 for discharging the recording sheet 2, an expeditor roller 13, and a recovering system 14 for cleaning the ink discharge nozzle surface of the printer head 3 and preventing unsatisfactory ink discharge, and a sheet feet knob 15 for manual sheet feed.

Recording sheet 2 is delivered to a recording portion at which the printer head 3 and the platen 10 are positioned in opposed relation. At this point of time, the quantity of rotation of feed rollers not shown is controlled so that the transport of paper to the recording portion is controlled. In the printer head 3 a piezo-electric element (PZT) is used as a source of energy generation for ink jetting. The piezo-electric element is subject to voltage application with the result that some distortion is caused to the element. This distortion causes a volumetric change to the ink-filled channel. As a result of this volumetric change, ink is discharged from a nozzle provided in the channel, and thus recording is made on the recording sheet 2.

The carriage 4 performs horizontal scanning in the shifting direction (a traversing direction with respect to recording sheet 2) by means of drive motor 7, idle pulley 8, and timing belt 9, and the printer head 3 mounted to the carriage 4 records images for one line. Each time one-line recording is completed, the recording sheet 2 is forwarded in a shifting direction for being scanned by te carriage 4 in reversing direction, and then the next line is recorded.

Images are recorded on the recording sheet 2 in this way, and the recording sheet which has passed through the recording section is discharged by the discharge roller 12 disposed on the downstream side of sheet transport and the expeditor roller 13 held in pressure contact therewith.

Figure 2:
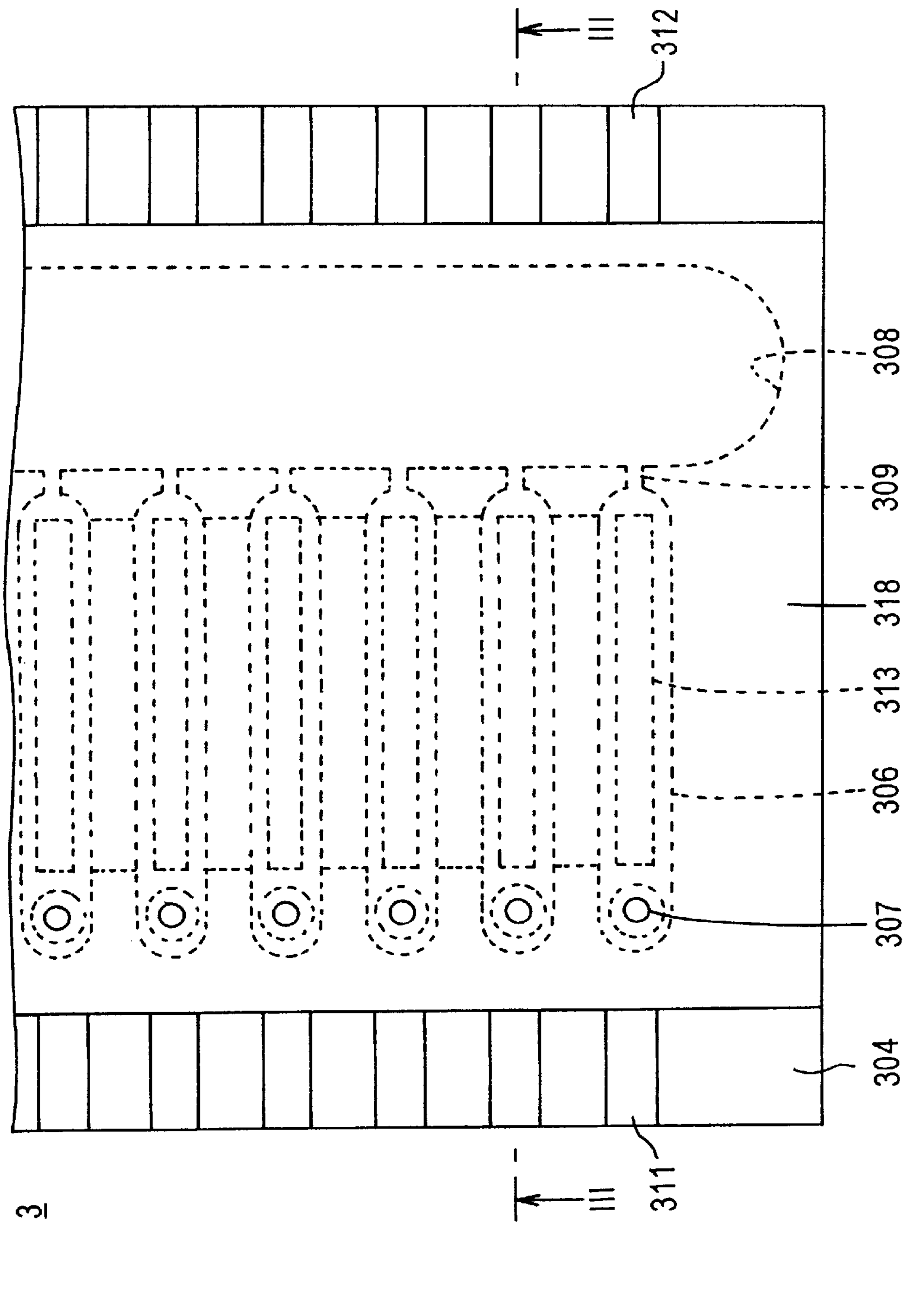
FIG. 2 is a plan view of a printer head.
Figure 3:
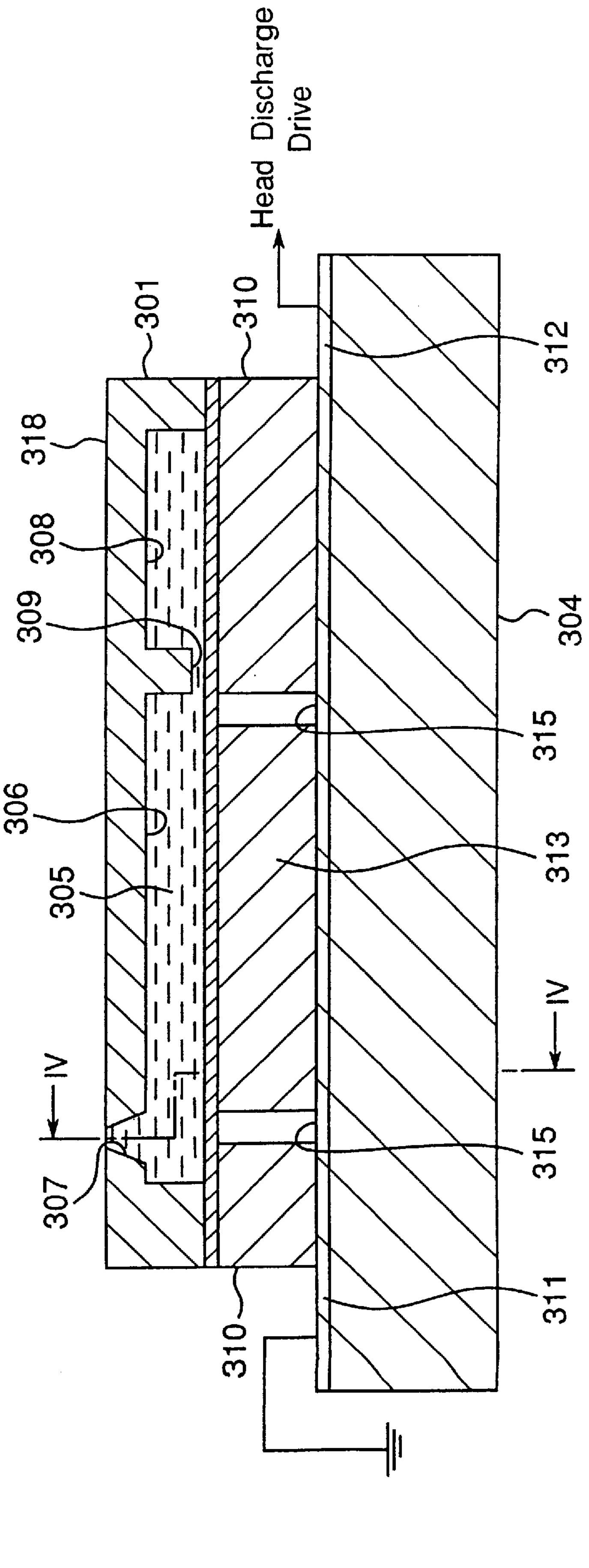
FIG. 3 is a sectional view taken on line III—III of the printer head shown in FIG. 2.
Figure 4:
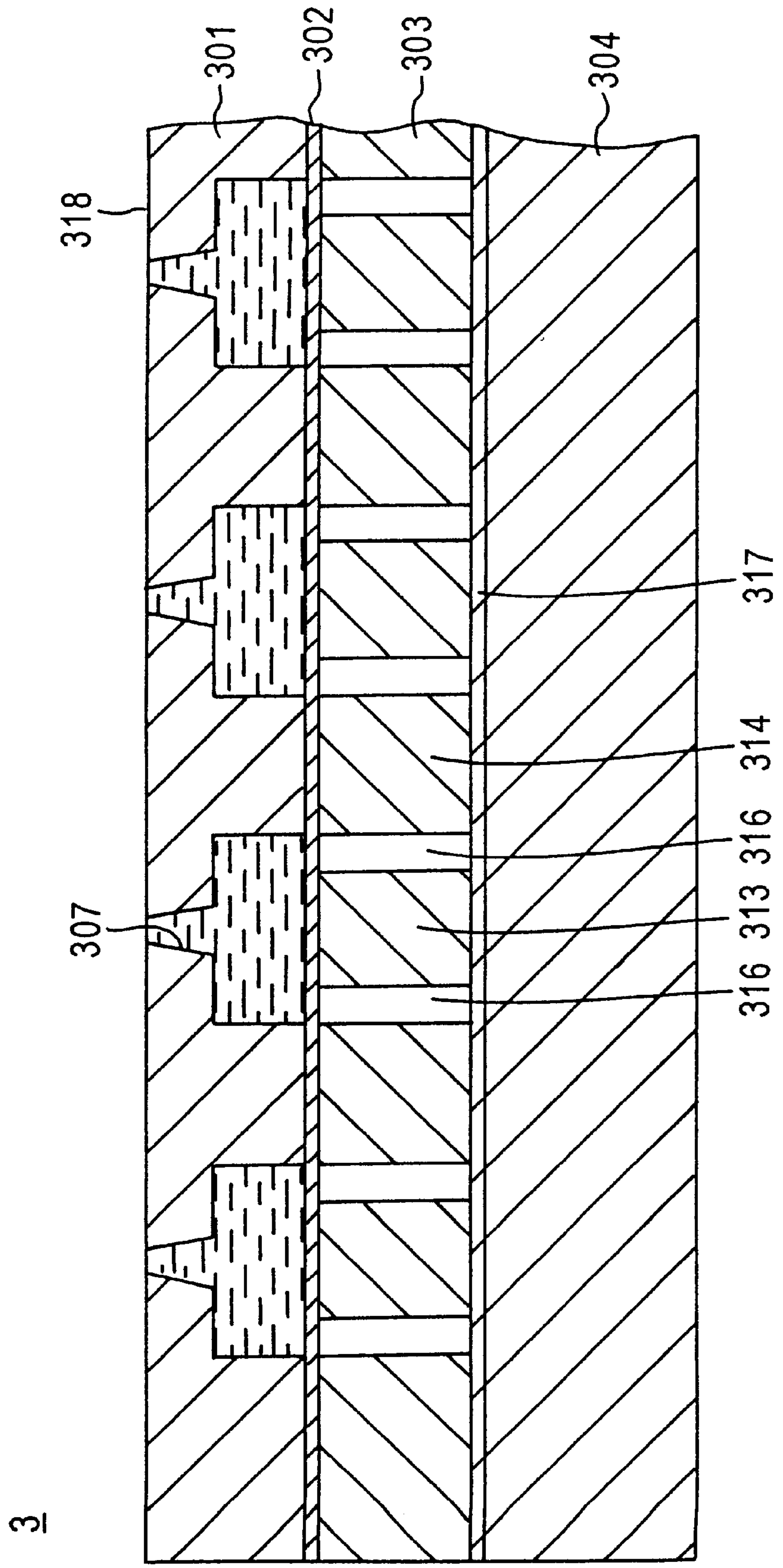
FIG. 4 is a sectional view taken on lines IV—IV of the printer head shown in FIG. 3.

FIGS. 2 to 4 are views explanatory of the arrangement of the printer head 3. FIG. 2 is a plan view of the surface of printer head 3 which has nozzles. FIG. 3 is a section taken along line III—III in FIG. 2. FIG. 4 is a section taken along line IV—IV in FIG. 3.

The head portion of the printer head 3 comprises a nozzle plate 301, a partition wall 302, an oscillator plate 303, and a substrate 304 which are integrally superposed. The nozzle plate 301 is formed of metal, synthetic resin, glass, or ceramic material, and has nozzles 307, with an ink repellent layer 318 formed on its surface 301. The partition wall 302 is comprised of a thin film and is fixedly placed between the nozzle plate 301 and the oscillator plate 303. Formed between the nozzle plate 301 and the partition wall 302 are a plurality of ink channels 306 for housing ink 305, and ink inlets 309 for connecting individual ink channels to an ink supply chamber 308. The ink supply chamber 308 is connected to the ink cartridge, and ink 305 in the ink supply chamber 308 is fed to the ink channels 306.

The oscillator plate 303 includes a plurality of piezo-electric elements 313 corresponding to respective ink channels 306. The oscillator plate 303 is worked in the following way. First, oscillator plate 303 is fixed with an insulative adhesive to a substrate 304 having a wiring portion 317, and is then subjected to dicer working for formation of separate channels 315, 316, so that oscillator plate 303 is scissioned into parts. As a result of this scissioning, a piezo-electric element stud portion 314 located between a piezo-electric element 313 corresponding to each ink channel 306 and each adjacent piezo-electric element 313, and a peripheral wall 310 surrounding these elements are scissioned into parts. A wiring portion 317 on the substrate 304 includes a common electrode wiring portion 311 grounded and connected in common to all piezo-electric elements 313 within the printer head, and a discrete electrode wiring portion 312 connected discretely to respective piezo-electric elements 313 within the printer head. The common electrode wiring portion 311 on the substrate 304 is connected to a common electrode in each piezo-electric element 313, and the individual electrode wiring portion 312 is connected to discrete electrodes in the piezo-electric elements 313.

Operation of the printer head of such arrangement is controlled by a controller of the ink jet printer 1. A predetermined voltage, i. e., a print signal, from a head discharge drive 105 (see FIG. 5) of the controller is applied across the common electrode and discrete electrode provided within each respective piezo-electric element 313, and the piezo-electric element 313 is deformed in a direction toward which the partition wall 302 is biased. The deformation of the piezo-electric element 313 is signalled to the partition wall 302, and accordingly ink 305 in the ink channel 306 is pressurized, whereupon an ink drop is caused to jump toward recording sheet 2 through nozzle 307.

Figure 5:
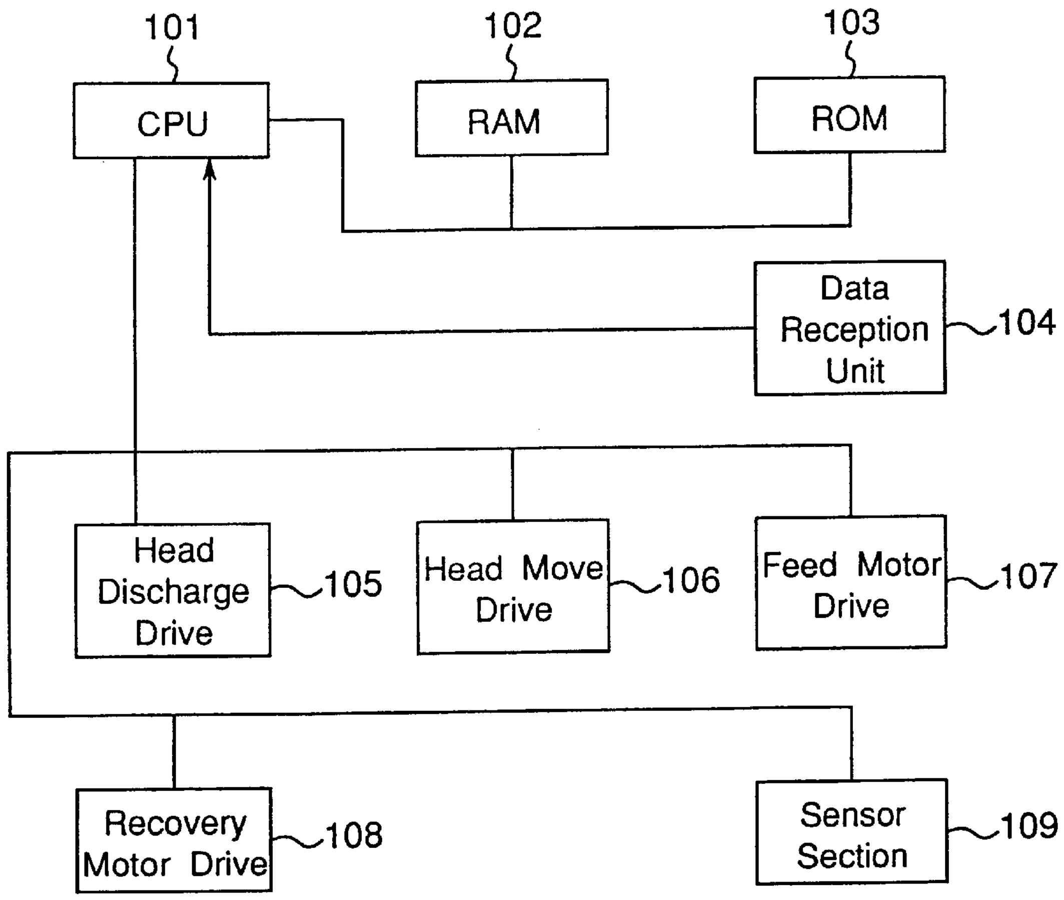
FIG. 5 is a block diagram showing control system of ink jet printer.

FIG. 5 is a block diagram showing general configuration of the controller of the ink jet printer 1. The controller of the ink jet printer 1 includes CPU 101, RAM 102, ROM 103, a data reception unit 104, a head discharge drive 105, a head move drive 106, a paper feed motor drive 107, a recovery motor drive 108, a sensor section 109. Varying resistance values at piezo-electric elements 313 under ambient temperature conditions are detected by the sensor section 109, and the driving voltage to be applied by the head discharge drive 105 to each piezo-electric element 313 is adjusted accordingly. The value of resistance at each piezo-electric element 313 is measured when the predetermined voltage or a print signal is not applied to the piezo-electric element 313.

CPU 101 which controls entire operation executes a program stored at ROM 103 using RAM 102 as required. This program includes portions for controlling the head discharge drive 105, head move drive 106, feed motor drive 107, and sensor section 109 on the basis of image data read from the data reception unit 104 connected to host computer and the like which receives image data to be stored, and for recording such images on recording sheet 2, and portions for controlling the recovery motor drive 108 and sensor section 109 for restoring the nozzle surface of the printer head 3 to satisfactory condition wherever necessary. In accordance with the control of CPU 101, the head discharge drive 105 drives the piezo-electric elements 313 of the printer head 3; the head move drive 106 drives the drivemotor 7 for moving the carriage 4 which carries the printer head 3, in a shift direction, and the feed motor drive 107 drives the feed roller. In accordance with the control of CPU 101, the recovery motor drive 108 drives motors necessary for restoring the nozzle surface of the printer head 3 to satisfactory condition.

The above described ink jet printer 1 can vary the dot size in 7 steps by changing the drive voltage of the piezo-electric elements 313, and can perform recording in eight tones (including no-ink discharge). That is, by controlling the voltage to be applied to piezo-electric element 313 it is possible to vary the quantity of deformation of piezo-electric element 313 and pressure applied upon the ink in the ink channel, thereby varying the quantity of ink discharge from the nozzle 307 and dot size. Specifically, when 8 V voltage is applied to piezo-electric element 313, dot size of discharged ink on a sheet is about 30 $\mu$m. When 50 V voltage is applied to piezo-electric element, ink dot size on the sheet is about 130 $\mu$m. By varying the voltage to be applied to the piezo-electric element between 8 V and 50 V it is possible to reproduce ink dots in seven different dot sizes between about 30 $\mu$m and about 130 $\mu$m. It is noted that the foregoing shows tone reproduction at an ambient temperature of 25° C.

In the above described ink jet recording apparatus, image formation was made on super fine paper (made by EPSON K.K.) by using ink A which had surface tension measurements (dyne/cm) of 32.7 at 5° C., 31.5 at 25° C., and 31.3 at 40.0° C., ΔS=0.04; a viscosity of 2.5 (cps) at 25° C.; a pH value of 8.7. Dots were formed under the conditions of: voltage applied to piezo-electric element 313, 8V; and ambient temperatures, 25° C. and 35° C. At 35° C., only a slight increase was seen in dot size over the dot size at 25° C. Also, dots were formed under the conditions of: voltage applied, 50° V; and ambient temperatures, 10° C. and 25° C. At 10° C., a slight dot size reduction was seen.

Similarly, image formation was made by using ink B which had surface tension measurements (dyne/cm) of 31.1 at 5° C., 29.7 at 25° C., and 29.0 at 40.0° C., ΔS=0.07; a viscosity of 2.5 (cps) at 25° C.; a pH value of 8.6. Dots were formed under the conditions of: voltage applied to piezo-electric element 313, 8V; and ambient temperatures, 25° C. and 35° C. At 35° C., only a slight increase was seen in dot size over the dot size at 25° C. Also, dots were formed under the conditions of: voltage applied, 50 V; and ambient temperatures, 10° C. and 25° C. At 10° C., a slight dot size reduction was seen.

Similarly, image formation was made by using ink C which had surface tension measurements (dyne/cm) of 39.0 at 5° C., 35.8 at 25° C., and 32.3 at 40.0° C., ΔS=0.19; a viscosity of 1.7 (cps) at 25° C.; a pH value of 8.1. Dots were formed under the conditions of: voltage applied to piezo-electric element 313, 8V; and ambient temperatures, 25° C. and 35° C. At 35° C., some dot size enlargement occurred. But this could be coped with by slightly lowering the applied voltage and no problem was found from the standpoint of practical use. Also, dots were formed under the conditions of: voltage applied, 50 V; and ambient temperatures, 10° C. and 25° C. At 10° C., some dot size reduction occurred. But this could be coped with by slightly raising the applied voltage and no problem was found from the standpoint of practical use.

Similarly, image formation was made by using ink D which had surface tension measurements (dyne/cm) of 37.4 at 5° C., 28.7 at 25° C., and 21.2 at 40.0° C., ΔS=0.56; a viscosity of 2.5 (cps) at 25° C.; a pH value of 8.4. Dots were formed under the conditions of: voltage applied to piezo-electric element 313, 8V; and ambient temperatures, 25° C. and 35° C. At 35° C., some dot size enlargement occurred as compared with the dot size at 25° C. An attempt was made to cope with this situation by lowering the applied voltage, but as a consequence no stable ink discharge could be obtained. Dots were also formed under the conditions of: voltage applied, 50 V; and ambient temperatures, 10° C. and 25° C. At 10° C., some dot size reduction occurred. An attempt was made to cope with this situation by raising the applied voltage, but as a consequence satellites were produced.

For reference, ink A is an ink comprised of: 3.0 parts by weight of C. I direct blue 199 as color material, 12.0 parts by weight of diethylene glycol, 6.5 parts by weight of triethylene glycol monobutyl ether, 4.5 parts by weight of polyethylene glycol (molecular weight: 400), 0.8 part by weight of nonionic surface active agent (OLFINE E1010; made by Nisshin Kagaku Kogyo K. K.), 0.2 part by weight of triethanol amine, 0.2 part by weight of sodium hydrogen carbonate, and 0.3 part by weight of anti-mildew agent (PROXEL XL-2); made by Zeneca K.K.), with deionized water added to give a total of 100 parts by weight.

Ink B is an ink comprised of: 3.0 parts by weight of C. I direct blue 199 as color material, 12.0 parts by weight of diethylene glycol, 6.5 parts by weight of triethylene glycol monobutyl ether, 4.5 parts by weight of polyethylene glycol (molecular weight: 400), 0.3 part by weight of nonionic surface active agent (OLFINE E1004; made by Nisshin Kagaku Kogyo K. K.), 0.2 part by weight of triethanol amine, 0.2 part by weight of sodium hydrogen carbonate, and 0.3 part by weight of anti-mildew agent (PROXEL XL-2); made by Zeneca K.K.), with deionized water added to give a total of 100 parts by weight.

Ink C is an ink comprised of: 4.5 parts by weight of C. I hood black 2 as color material, 6.0 parts by weight of diethylene glycol, 6 parts by weight of triethylene glycol monobutyl ether, 4.5 parts by weight of polyethylene glycol (molecular weight: 400), 2.0 parts by weight of ethyl alcohol, 0.8 part by weight of nonionic surface active agent (OLFINE E10110; made by Nisshin Kagaku Kogyo K. K.), 0.2 part by weight of triethanol amine, 0.2 part by weight of sodium hydrogen carbonate, and 0.3 part by weight of anti-mildew agent (PROXEL XL-2); made by Zeneca K.K.), with deionized water added to give a total of 100 parts by weight.

Ink D is an ink comprised of: 3.0 parts by weight of C. I direct blue 199 as color material, 12.0 parts by weight of diethylene glycol, 6.5 parts by weight of triethylene glycol monobutyl ether, 4.5 parts by weight of polyethylene glycol (molecular weight: 400), 0.3 part by weight of nonionic surface active agent (polyether modified silicone oil TSF4452; made by Toshiba Silicone K. K.), 0.2 part by weight of triethanol amine, 0.2 part by weight of sodium hydrogen carbonate, and 0.3 part by weight of anti-mildew agent (PROXEL XL-2); made by Zeneca K.K.), with deionized water added to give a total of 100 parts by weight.

According to the ink jet recording method of the present invention, as described above, the problem of low dot image reproducibility on the larger dot-size side in a low temperature environment and the problem of low dot image reproducibility on the smaller dot-size side in a high temperature environment can be overcome without the reproducible range of dot size being narrowed. Thus, the multiple tone reproducibility, as well as high-precision image reproducibility, of the dot size control system can be enhanced.

What is claimed is:

1. An ink jet printer which performs recording by causing an ink drop to be discharged from a nozzle and allowing the ink drop to deposit on a recording medium, the ink jet printer comprising a printer head including a nozzle for discharging ink drops and an ink channel in which an aqueous ink is housed, the printer head being capable of varying a dot size on the recording medium by changing the size of the ink drop to be discharged from the nozzle; and the aqueous ink having a degree of surface tension change ΔS expressed by the relation $\Delta S=(S_1-S_3)/S_2$ of 0.3 or less, and $S_2$ of 20 to 50 dyne/cm, in which $S_2$ is a surface tension of the aqueous ink at 5° C., $S_2$ is the surface tension at 25° C., and $S_3$ is the surface tension at 40° C.

2. An ink jet printer as set forth in claim 1, wherein the printer head includes a piezo-electric element such that by causing the piezoelectric element to be deformed, the volume of the ink channel is varied so that pressure is applied to the ink in the channel to cause ink to be discharged from the nozzle.

3. An ink jet printer as set forth in claim 2, wherein a quantity of volume change of the channel is varied depending on a quantity of deformation of the piezo-electric element to change a size of ink drop discharged from the nozzle.

4. An ink jet printer as set forth in claim 1, wherein the ΔS is 0.25 or less.

5. An ink jet printer as set forth in claim 4, wherein ΔS is 0.20 or less.

6. An ink jet printer as set forth in claim 1, wherein viscosity of the ink at 25° C. is 1.5 to 4.5 cps.

7. An ink jet printer as set forth in claim 1, wherein pH of the ink at 25° C. is 7 to 10.

8. An ink jet printer as set forth in claim 1, wherein the ink contains water, a color material, a water-soluble organic solvent, and a nonionic surface active agent.

9. An ink jet printer as set forth in claim 8, wherein the color material content of the ink is 0.5 to 20% by weight relative to the ink weight; the water-soluble organic solvent content is 1 to 30% by weight relative to the ink weight; and the nonionic surface active agent content is 0.01 to 5% by weight relative to the ink weight.

10. An ink jet printer as set forth in claim 9, wherein the water-soluble organic solvent contains at least one kind of alcohol solvents selected from the group consisting of glycerin, monoalkylene glycol, dialkylene glycol, trialkylene glycol, monoalkylene glycol lower alkyl ether, dialkylene glycol lower alkyl ether, trialkylene glycol lower alkyl ether, polyalkylene glycol having a molecular weight of 150 or more, and alkyl alcohol.

11. An ink jet printer as set forth in claim 9, wherein the nonionic surface active agent contains an alkylene oxide adduct of acetylene glycol.

12. An ink jet recording method in which multiple tone recording is performed by causing an ink drop to be discharged from a nozzle and allowing the ink drop to deposit on a recording medium, characterized in carrying out multiple tone recording on a recording medium by varying the size of ink drop discharged from a nozzle, the aqueous ink having a degree of surface tension change ΔS expressed by the relation $\Delta S=(S_1-S_3)/S_2$ of 0.3 or less, and $S_2$ of 20 to 50 dyne/cm, in which $S_1$ is a surface tension of the aqueous ink at 5° C., $S_2$ is the surface tension at 25° C., and $S_3$ is the surface tension at 40° C.

13. An ink jet recording method as set forth in claim 12, wherein the ΔS is 0.25 or less.

14. An ink jet recording method as set forth in claim 13, wherein the ΔS is 0.20 or less.

15. An ink jet recording method as set forth in claim 12, wherein viscosity of the ink at 25° C. is 1.5 to 4.5 cps.

16. An ink jet recording method as set forth in claim 12, wherein pH of the ink at 25° C. is 7 to 10.

17. An ink jet recording method as set forth in claim 12, wherein the ink contains water, a color material, a water-soluble organic solvent, and a nonionic surface active agent.

18. An ink jet recording method as set forth in claim 17, wherein the color material content of the ink is 0.5 to 20% by weight relative to the ink weight; the water-soluble organic solvent content is 1 to 30% by weight relative to the ink weight; and the nonionic surface active agent content is 0.01 to 5% by weight relative to the ink weight.

19. An ink jet recording method as set forth in claim 18, wherein the water-soluble organic solvent contains at least one kind of alcohol solvents selected from the group consisting of glycerin, monoalkylene glycol, dialkylene glycol, trialkylene glycol, monoalkylene glycol lower alkyl ether, dialkylene glycol lower alkyl ether, trialkylene glycol lower alkyl ether, polyalkylene glycol having a molecular weight of 150 or more, and alkyl alcohol.

20. An ink jet recording method as set forth in claim 18, wherein the nonionic surface active agent contains an alkylene oxide adduct of acetylene glycol.

* * * * *